United States Patent
Perring et al.

(12) 
(10) Patent No.: US 7,857,120 B1
(45) Date of Patent: Dec. 28, 2010

(54) AVALANCHE PREVENTATIVE SHIELD FOR SWEEP AUGER

(76) Inventors: Dave A. Perring, P.O. Box 221, Lincoln, IL (US) 62656; Steve E. Perring, R.R. 1 Box 51, Weldon, IL (US) 61882

( * ) Notice: Subject to any disclaimer, the term of this patent is extended or adjusted under 35 U.S.C. 154(b) by 106 days.

(21) Appl. No.: 12/418,414

(22) Filed: Apr. 3, 2009

(51) Int. Cl.
*B65G 33/34* (2006.01)

(52) U.S. Cl. .................. 198/671; 198/670; 414/310

(58) Field of Classification Search .............. 198/670, 198/671, 860.1, 860.3, 550.6; 414/310–312, 414/319
See application file for complete search history.

(56) References Cited

U.S. PATENT DOCUMENTS

| | | | | |
|---|---|---|---|---|
| 2,485,462 A | * | 10/1949 | Sinnott | 414/398 |
| 3,105,586 A | * | 10/1963 | Carew et al. | 198/530 |
| 3,487,961 A | * | 1/1970 | Neuenschwander | 366/133 |
| 4,008,816 A | | 2/1977 | Harrison | |
| 4,063,654 A | | 12/1977 | Shivvers | |
| 4,157,150 A | * | 6/1979 | Hetrick | 239/657 |
| 4,352,426 A | * | 10/1982 | Peterson, Jr. | 198/671 |
| 4,875,820 A | | 10/1989 | Lepp et al. | |
| 5,123,186 A | * | 6/1992 | Matushita et al. | 37/251 |
| 5,167,318 A | * | 12/1992 | Siemens | 198/550.01 |
| 5,511,925 A | | 4/1996 | Muth | |
| 6,254,329 B1 | | 7/2001 | Sukup et al. | |
| 6,948,902 B2 | * | 9/2005 | Hanig | 414/312 |
| 7,004,305 B2 | | 2/2006 | Schaefer | |

* cited by examiner

*Primary Examiner*—Mark A Deuble
(74) *Attorney, Agent, or Firm*—Kyle W. Rost

(57) ABSTRACT

A deflector panel or series of such panels are temporarily attached above the containment plate of a grain sweep auger to redirect potentially avalanching grain forward to the auger blade. A front side hook structure holds a predetermined portion of the deflector panel over the top of the containment plate at a forward angle. A rear side clamp on a sliding junction secures the forward angle and adapts the shield to fit auger assemblies with differing distance relationships between the containment plate and stiffening tube. A longitudinal series of deflector panels with interpanel gaps are attached to a sweep auger assembly along the length of the containment plate. A gap-filling bracket closes the gaps and supports the panels in longitudinal alignment.

11 Claims, 5 Drawing Sheets

AVALANCHE PREVENTATIVE SHIELD FOR SWEEP AUGER

BACKGROUND OF THE INVENTION

1. Field of the invention

The invention generally relates to material or article handling. More specifically, the invention relates to a static receptacle such as a grain storage bin and to non-gravity discharging means for use in such a receptacle. The discharging means may be a discharge assistant of the compound motion type, where the compound motion assistant is displaceable within the receptacle. The invention is specifically directed to improved apparatus for removing grain from a grain storage bin by a sweep auger assembly. The invention is a portable deflector shield that supplements the conventional structure of a sweep auger assembly and directs accumulated grain to the working side of the auger blade rather than allowing such grain to avalanche over the sweep auger assembly.

2. Description of Related Art Including Information Disclosed Under 37 CFR 1.97 and 1.98

After harvest, grain is stored in a grain storage bin or silo. When the grain is being removed, such as for shipment, a large amount of grain will not discharge from the storage bin under the normal discharge scheme that relies on gravity and a central takeout pit. A sweep auger frequently is used to remove this residual grain. It is notoriously well known that during removal of residual grain, sweep augers suffer from grain avalanche, which is a cascade of grain that passes over the top of an operating sweep auger, falling on the nonworking side where the sweep auger cannot remove this avalanched grain. Teams of workers follow a sweep auger with the intense job of shoveling the avalanched grain back to the working side of the auger. This problem is essentially universal with all known sweep auger designs. The present invention is the first known device that allows workers to correct the problem of avalanching grain by temporarily modifying the configuration of substantially any sweep auger, on the job site.

As background, a grain storage bin typically is cylindrical in shape or at least is circular at floor level. A sweep auger assembly is the standard automated device used for mechanically moving grain from peripheral areas of a storage bin to a central sump. Varieties of sweep augur assembly include both permanent augers that remain installed in a grain bin and portable augers that are brought into a grain bin for temporary use, when needed. U.S. Pat. No. 7,004,305 to Schaefer shows a sweep auger assembly that is formed of multiple small components that can be brought into a grain bin that suffers from limited access and then are assembled inside the bin. Sweep augers operate similarly to one another, although they differ in structure according to type. A permanent sweep auger is exactly sized to fit the bin, while a portable sweep auger is sold in limited, preselected sizes, often multiples of three or five feet. Grain storage bins likewise tend to have an inner radius that is a multiple of three feet, such that a portable sweep auger is likely to be available to fit closely into a grain storage bin.

The primary element of a sweep auger assembly is the auger blade that is approximately equal in length to a radius of the bin or of the area to be cleared. One end of the auger blade, referred to as the inner end, is located centrally in the bin or area to be cleared, near a central sump for discharging grain. The opposite or peripheral end of the auger blade, which will be referred to as the outer end, is located near the cylindrical wall of a cylindrical bin or otherwise at the periphery of an area to be cleared. The auger blade is disposed for rotation on a longitudinal axis of blade rotation that extends between these inner and outer ends, approximately tracking a sweeping or pivoting radius of the bin or area to be cleared. The inner end of the auger is joined near the sump to a central pivot, while the outer end carries a wheel or other drive device that carries the outer end around a circular path at the area periphery or cylindrical wall of the bin. The wheel or other drive device is driven in a preestablished direction that will be referred to as the forward direction. Thus, a drive motor and suitable transmission, coupling, or gearing enable the auger blade to rotate as the auger sweeps forward around the bin from the central pivot point. The auger blade rotates on the longitudinal axis in a rotational direction suitable to impel the grain toward the central sump as the auger moves forward around its circular path.

An auger with a substantially bare auger blade would operate with poor efficiency because grain would fall out the back side of the forward advancing sweep auger. Various types of auger pumps are known, where an auger operates inside a tube that keeps a payload largely within the spiral voids of the auger blade. Sweep augers emulate the pump art to the extent possible, by employing a containment plate over the back side of the auger blade. The back of the sweep auger blade is defined as the trailing face of the blade as the auger moves in the preestablished forward direction. As derived from the pump art, the containment plate is configured as an arc or elongated trough that parallels the rear side of the auger blade and extends for the length of the auger blade. One the auger blade has picked up grain, the containment plate helps to keep the grain in the spiral voids of the auger blade. Because the sweep auger also advances in a forward direction, the containment plate further prevents the auger from leaving the grain behind, as otherwise grain could simply fall out of the auger blade's rear side. However, a containment plate does not solve the problem of grain avalanche.

The containment plate may include a scraper at its bottom edge to help pickup grain and lift it into the auger blade. U.S. Pat. No. 5,511,925 to Sukup shows an adjustable scraper at the bottom of a containment plate. A containment plate is spaced from the rear of an auger blade by a small distance such as an inch to provide clearance and to provide capacity for holding grain. The containment plate can be a part of a frame assembly including end support frames and brackets that carry the auger blade. End support brackets of the frame assembly support the main shaft of the auger blade in bearings.

An auger blade and a containment plate are longitudinally elongated and might sag due to length. A stiffening member or torsion tube is commonly installed between the inner and outer end frame members and is connected to the containment plate to resist sag. U.S. Pat. No. 4,008,816 to Harrison shows a stiffening tube, which Harrison refers to as a torsion arm or torsion tube, joined between the end support brackets, supporting and stiffening the containment plate through clamps between the containment plate and torsion tube at various positions along the torsion tube.

A motor provides power to rotate the auger blade. The same motor or a second motor drives the wheel on the outer end of the auger assembly for advancing the outer end around the bin or area to be cleared. U.S. Pat. No. 4,063,654 to Shivvers shows a sweep auger rotated on a main shaft by a remote drive motor, supported on a wheel at the outer end of the main shaft, and advanced by a ratchet mechanism connected at the outer end of the main shaft and operating in a peripheral, circular track.

The rotational speed of the auger blade typically is greater than the rotational rate of the wheel. A gearbox, transmission, or the like can be used to direct power from the appropriate motor to the auger blade and wheel to establish a wheel speed suitable for advancing the auger, where the wheel speed is suitable for a speed of auger blade rotation. Where a single motor is used to drive both the auger blade and the wheel, a gear reducer controls the wheel speed so that the single motor can drive both the wheel and the auger blade at approximately suitable speeds for transporting grain. However, this ratio is not correct to prevent avalanching in all conditions, due to many variables beyond the control of the auger manufacturer. These include ambient conditions within the bin, characteristics of the particular crop being conveyed, grain depth and distribution pattern, and operating capacity of the auger as compared to size of the bin.

A purpose of initial storage is to reduce the moisture content of grain. To achieve this, the grain bin may be equipped with a perforated floor and powerful fans beneath the floor blowing air into the bin from the bottom. The grain at the bottom of the bin dries first and is removed to another storage location so that grain from higher in the bin can drop to the bottom for further drying. A permanent sweep auger at floor level can be buried under grain when the bin is filled and later used to remove the bottom grain by moving it from all lateral portions of a bin to a central well or sump. Other augers in the sump feed an unloading chute such that grain can be discharged to a waiting truck or conveyor system that is positioned below the unloading chute to receive the grain. Similar equipment can unload an entire storage bin when the crop is to be shipped.

A sweep auger adapted to function while buried under a load of grain must operate under extreme preload. A motor that powers a permanent auger may be located below the floor or outside the bin, where the motor powers the auger through an intermediate coupling. Through a transmission or multiple coupling, the same motor may power additional augers or conveyors in the bin, such as an auger in the sump or unloading chute. A problem with buried augers is that the transmission or couplings may fail, especially if the sweep auger is overly preloaded by dense grain. To reduce the preload problem, an auger designed to operate when buried in grain has a containment plate that extends over the top of the auger blade, forming a substantially horizontal top cover that shields the auger blade from overhead grain. A containment plate that is a top cover does not solve the problem of avalanching. In fact, it contributes to avalanching by deflecting grain from falling into the blade, causing the deflected grain to pass behind the operating auger. U.S. Pat. No. 4,063,654 to Shivvers shows a sweep auger with a top plate over the auger blade, restricting overhead grain intake capacity.

Access limiting top cover and front shields are used in other situations where a sweep auger should not feed too much grain to a downstream location, such as where a downstream auger might become blocked. The Shivvers sweep auger feeds a second, unloading auger and limits payload to prevent blocking. U.S. Pat. No. 5,511,925 to Muth shows both a top plate and a moveable front shield that partially covers the front of the sweep auger blade, greatly restricting the available intake opening. The Muth auger appears to serve a purpose similar to Shivvers, where a permanent auger at the bottom of a grain storage bin is designed to remove bottom layers of grain in a measured process. In addition, the Muth arrangement is directed to a sweep auger feeding a second, vertical lift auger of lower capacity, creating a danger of blocking if the sweep auger delivers grain too quickly to the second auger. Grain augers having top covers and front shields as described in Shivvers and Muth are generally not suitable for use with the present invention.

As described, above, the crop in a grain bin can be unloaded by gravity through the central sump. However, when the stored grain reaches an angle of repose, it will cease to grain by gravity, alone. At this stage of unloading, mechanical assistance is needed to move the remaining grain to the sump. A sweep auger provides the necessary assistance. A portable sweep auger tends to be self-contained, having an auger blade, containment plate, motor, pivot receptor at the inner end, and wheel or other advancement device at the outer end. In addition, a portable sweep auger has a substantially open top, as contrasted with an auger that employs a top cover.

A portable sweep auger is brought into the grain storage bin to remove the residual grain. A portable auger operates at the top of the residual grain and moves grain for the top of the stored load to feed the sump or takeout pit. A grain storage bin provides a fixed central pivot to which the inner end of a portable sweep auger can be pivotally attached. Moving grain to market takes place at a busy time in the agricultural community. A crew of follow-up workers accompanies a portable sweep auger to each storage bin. The inner end of the portable auger is placed on the central pivot, and the auger is operated to clear the storage bin in a single sweep. Constraints of both time and efficiency of operation limit the use of a portable sweep auger to a single sweep. In terms of time, follow-up crews are too busy to wait for such an auger to sweep a bin twice. In terms of efficiency, once the auger has completed a single sweep around the bin, too little grain remains in the bin for the auger to pick up a sufficient load for an efficient second revolution. Nevertheless, the avalanched grain is a large amount in terms of bushels. Thus, follow-up workers equipped with grain shovels have faced the difficult, intense task of follow the auger and restoring avalanched grain to the working side of the auger, all within a single sweep. When the auger is finished with one sweep of a storage bin, the follow-up crew must rapidly remove the auger and advance to the next bin. Any grain that is not swept to the sump is lost.

Grain avalanche over the auger is a major problem with portable sweep augers. As the term implies, grain avalanche is a massive flow of grain over the advancing sweep auger, overrunning the trailing containment plate. Avalanche may occur due to radial fling, due to horizontal overrun, or due to some combination of these and other operating conditions, including the irregular depth and distribution of residual grain in the storage bin. A contributing factor may be imbalance between the rate of grain intake and the rate of auger blade operation. This condition can arise at any time, but especially when the auger digs into irregular masses of stored grain. One of the major tasks of the follow-up work crew is to try to recover the avalanched grain within a single sweep of the bin.

Accordingly, it would be desirable to have a means by which a follow-up work crew could temporarily modify a sweep auger to substantially eliminate grain avalanche. With the exception of sweep augers that are extensively shielded from receiving grain, as by top covers and front shields, a suitable temporary modification can increase auger efficiency sufficiently to solve the avalanche problem. Such a temporary modification may be made permanent. As is evident, the modification is desirable, at least during removal of residual grain, because it increases the operational payload of a sweep auger to handle the grain that otherwise would avalanche over the auger.

It would be further desirable for such a temporary modification to be made so quickly and easily that it does not substantially delay the progress of work. The modification should be made without requiring tools, as tools are easily lost in a grain bin. The modification should be made in a matter of minutes, both for installation and removal, so that the overall installation and removal of the sweep auger is not slowed to a significant extent.

To achieve the foregoing and other objects and in accordance with the purpose of the present invention, as embodied and broadly described herein, the method and apparatus of this invention may comprise the following.

BRIEF SUMMARY OF THE INVENTION

Against the described background, it is therefore a general object of the invention to provide overhead, forward facing grain deflectors that cooperate with an operating sweep auger to catch and forward-feed grain that otherwise would avalanche over the auger. Applicant believes that in many installations, the loss of grain by avalanche over a sweep auger is due to the dynamics of grain movement, which conventional sweep auger design fails to anticipate. Thus, many sweep augers suffer from avalanching due to a lack of grain management features, requiring needlessly large amounts of follow-up worker's time and energy to complete a grain movement. Accordingly, an aspect of the present invention is the discovery that a sweep auger can handle a payload greater than provided by unassisted intake through advancement across the stored grain in a storage bin. A general object of the invention is to improve the efficiency of intake management in a sweep auger so that it conveys a greater average payload than achieved by unsupplemented operation, thus increasing the practical operating capacity of the auger. A related object is to reduce the amount of manual labor needed to follow-up an operating sweep auger to recover avalanched grain from behind the auger.

According to the invention, a deflector panel or series of such panels are selectively attached to a sweep auger assembly of a compatible design wherein an auger blade is backed by a containment plate, the containment plate is backed by a stiffening tube, and a top portion of the containment plate is disposed at a forward acute angle as measured from vertical, leaving the top of the auger blade substantially uncovered. The deflector panel carries a cooperating plurality of means for securing the deflector panel to the sweep auger assembly. A first securing means is a means for engaging a containment plate in a manner establishing the panel to display a predetermined reveal above the containment plate. A second securing means is a means for establishing the reveal at a selected forward angle and for adapting the shield to auger assemblies with differing distance relationships between a containment plate and stiffening tube. Where a series of deflector panels are attached to a sweep auger assembly, a third securing means is a means for closing the gap between juxtaposed deflector panels in the series. The secured deflector panels improve auger operation by opposing and deflecting the avalanche of grain over the moving auger.

Preferred extension panels are of modular construction in lengths such as three feet so that a suitable number of panels can be applied to approximately match the longitudinal length of any sweep auger. Each panel is provided with a system of attachment means for securing the panel on sweep auger to withstand operational forces. One component of the attachment means is a channel clip that engages over the top of the containment plate from the front side of the deflector shield. This attachment places the plane of the deflector shield both above and behind the containment plate.

Another component of the attachment means is a tube clamp that engages the stiffening tube from the rear side of the deflector shield. This attachment establishes the deflector shield at a forward acute angle and locks the deflector shield against longitudinal displacement. The deflector shield carries the tube clamp by a vertically sliding junction such that the vertical position of the tube clamp is variable with respect to the deflector shield. The sliding junction provides adjustability for mounting to sweep augers with different proportion between their containment plates and stiffening tubes. The tube clamp is a compression clamp that holds the deflector shield at a fixed longitudinal position along the containment plate.

The means for closing the gap between juxtaposed deflector panels in the series is a bracket with vertical slots in opposite side edges. The slotted bracket is H-shaped in horizontal cross-section. This bracket fits between the side edges of each two juxtaposed deflector shields, engaging opposed side edges in the opposite vertical slots of the "H" design. The bracket unifies each two neighboring deflector shields into a longitudinally continuous member.

According to another aspect, the invention is a portable deflector shield for managing grain intake to a sweep auger to prevent grain for avalanching over the auger. The shield is suited for attachment to the containment plate and stiffening tube of a sweep auger. The shield includes a longitudinally elongated panel having front and rear major faces, top and bottom edges, and side edges at longitudinally opposite ends. An engagement device fits over the top edge of a containment plate of a sweep auger. The engagement device includes a stop wall and a catch wall. The stop wall extends in leading position from the front face of the panel with longitudinal orientation and is spaced between the top and bottom edges of the panel, such that the stop wall can engage against the top edge of the containment plate of a sweep auger. The stop wall supports an upper portion of the panel above the containment plate, thereby defining a reveal portion of the panel above the stop wall. The catch wall depends from the stop wall, and together with the stop means defines an open-bottom cavity between the catch wall and the panel. A vertical position stabilizing means is located in a trailing position relative to the rear face of the elongated panel. The vertical position stabilizer engages the stiffening tube of a sweep auger to establish the elongated panel at a forward angle on the containment plate.

According to a further aspect of the invention, a grain deflector shield fits on a grain sweep auger to prevent grain avalanche over the sweep auger. The shield has a top edge, bottom edge, and front and rear faces, and is suited for mounting to a sweep auger assembly having an auger blade, a containment plate backing the auger blade, and a stiffening tube backing the containment plate, the grain deflector. The deflector shield includes an elongated panel having an upper panel portion defining a reveal and having a lower panel portion supporting a system of securing devices for mounting the elongated panel on an auger. The system of securing devices includes a channel hook connected to the front face of the panel, having an open bottom and open sides. The channel hook can be placed over the top of a containment plate. The channel hook has a top wall that limits entry of the containment plate into the channel hook and establishes a division between upper and lower panel portions. Another part of the securing devices is a tube clamp that is connected to the rear face of the lower portion of the panel. The tube clamp has an open end for placement over the stiffening tube of a sweep auger. Further, the tube clamp includes a tightening device. A slidable junction operates between the deflector panel and the tube clamp to allow relative movement over a top-to-bottom axis.

The accompanying drawings, which are incorporated in and form a part of the specification, illustrate preferred

DETAILED DESCRIPTION OF THE INVENTION

Figure 1:
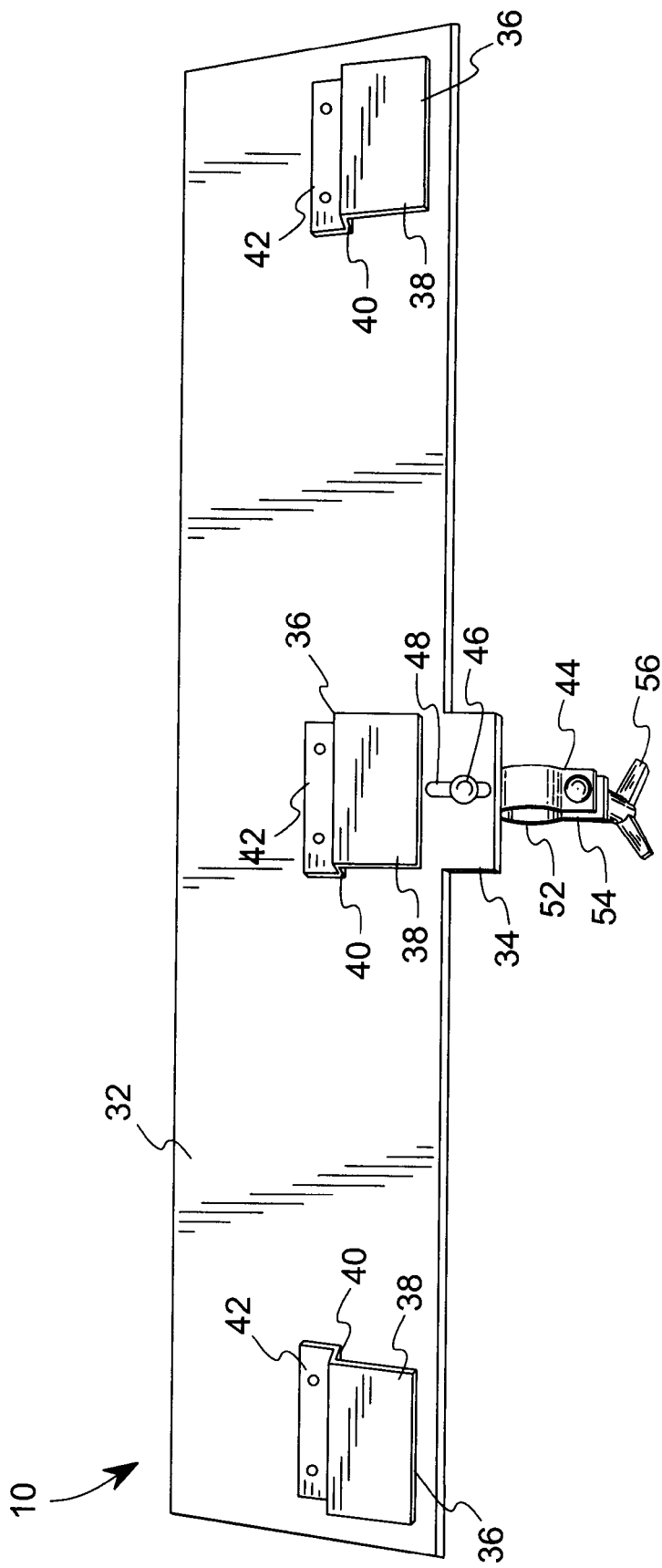
FIG. 1 is a front isometric view of the avalanche preventative shield.

The invention is an apparatus for improving the efficiency of intake management in a sweep auger so that it conveys a greater average payload than achieved by unsupplemented operation, thus increasing the practical operating capacity of the auger. preventing or reducing the overflow of grain from the front side of a sweep auger assembly over the auger assembly as the auger assembly advances in a grain storage bin. The apparatus is a portable, overhead, forward-directed deflector shield 10 that can be readily applied or removed from a sweep auger assembly 12 of compatible design. More specifically, a compatible sweep auger assembly incorporates design features usually associated with portable sweep auger assemblies, where the top of the auger blade is substantially open and a containment plate backing the auger blade angles forward at an acute angle less than horizontal.

This description will include terms expressing orientation, such as vertical and horizontal. These terms refer to the common orientation of components, such as the orientation of a sweep auger when located on a horizontal surface, the orientation of a deflector shield when mounted to a sweep auger on a horizontal surface, or to the perpendicular direction from horizontal. When in use, these components may be oriented at other angles or orientations than vertical and horizontal. However, terms such as vertical and horizontal should be interpreted as though the components were in their common orientation, typically with a horizontal surface as a base or reference.

Feed and seed grains and similar commodities are stored in cylindrical grain bins on the farm or commercially. These storage units are primarily constructed of heavy gauge metal or concrete. The diameter and height of these storage units vary greatly depending on when they were constructed, the needs of a farming operation, or the needs of a commercial facility to serve a particular geographical area. Although not all farms have grain storage and therefore some must utilize commercial alternatives, most grain storage units operate similarly when emptying the grain bins of their stored grain. The grain storage bins normally have at least one sump or takeout port in the center of the grain bin. Depending on the size of the grain bin, two or more of these takeout pits may span the diameter of the grain bin. These take out ports allow for the grain to be dropped onto a takeout auger or conveyor belt so as to empty the grain storage unit.

The takeout auger or conveyor belt systems traditionally are positioned beneath the sump or takeout ports, beginning at the center of the grain bin and moving their load directly to the outside of the grain bin. The practice of unloading grain bins via this means is nearly universal. Gravity drops the grain to the unloading pit within the grain bin, creating a constant feed of grain that unloads the storage facility. Grain empties from the grain bin in a funnel shape. In almost any grain bin, regardless of the size of the grain bin and the number of takeout sumps, eventually the grain will cease to flow. With variation that depends on the diameter and size of the grain storage unit, several thousand bushels of grain will remain inside the storage unit. This remaining grain must be removed by a different means.

The removal of remaining grain can be accomplished in several ways. One way is for a large industrial vacuum to vacuum out the grain. Another is by use of a power sweep auger, which may be a fixture within the grain bin or may be a portable sweep auger that is brought into the grain bin on a temporary basis. A sweep auger assembly is used in a grain storage bin for moving grain from outer areas of the bin to a central discharge opening. A grain storage bin often is built to accommodate the use of a sweep auger assembly. Such an accommodating grain storage bin is configured with a circular or conical floor, and the bin may further be built as a vertical cylinder. The floor of such a storage bin has a circular inner periphery. A pivot is installed at the center point of the circle, and the sweep auger assembly is sized to extend approximately from the pivot to the periphery. The sweep auger assembly is rotatably connected at one end to the pivot, while a forward drive mechanism at the opposite end is operated to move the second end of the sweep auger assembly around the periphery of the bin. The sweep auger assembly is also powered to rotate the auger blade so as to move grain to the discharge opening from any point where the sweep auger assembly encounters grain.

A suitable sweep auger assembly 12 is formed of an auger blade assembly 14 and an associated containment plate 16. The auger blade assembly can be viewed as having a working side, which is also the front side. The working side is opposite from containment plate 16, while the rear side faces the containment plate. Auger blade assembly 14 is formed of a central, longitudinal shaft 18 and helical flighting 20 attached to the shaft. A motor is connected to auger blade assembly 14 through suitable gearing, belt, or other driving arrangement to drive auger blade assembly 14 in a predetermined direction of rotation on an axis of rotation substantially collinear with shaft 18. Auger blade assembly 14 is turned in a suitable direction to move grain from the periphery of the bin toward the discharge opening. At the same time, auger blade assembly 14 is moved over the floor of the bin in what is termed a forward direction, which is the direction in which the auger blade assembly 14 leads containment plate 16. Moving in a forward direction while rotating, auger blade assembly 14 picks up grain in the spiral flutes of helical flighting 20, aided by the forward sweeping motion of auger assembly 12.

Containment plate 16 backs auger blade assembly 14 over a limited height or arc of auger blade assembly 14. Commonly, the containment plate is approximately the height of the auger blade assembly. For a sweep auger 12 that is compatible with the grain deflector shield 10, a defining feature is that the containment plate 16 backs auger blade assembly 14 but does not define a top cover over the auger blade. Another measure of compatibility is that the containment plate 16 is not a horizontal cover over the top of auger blade assembly 14. Rather, the topmost portion of containment plate 16 is angled forward at an acute angle from vertical but does not angle so far as to become a horizontal cover over the center area of the blade. The containment plate typically is offset to the rear side of the auger blade by about an inch, such that the containment plate may have little or no overlap with the top of the auger blade.

A sweep auger assembly 12 that is built into a grain storage bin may nonetheless be suitable for use with shield 10 if containment plate 16 of such an auger assembly is suitably limited in degree of surround, if any. As a useful guideline, containment plate 16 of a portable sweep auger assembly may surround about a fifth to a third of the periphery of auger blade assembly 14, and this surround is almost entirely at the rear side of the auger blade. Thus, a containment plate often covers an arc of seventy to one hundred and twenty degrees. Where the containment plate is not configured in an actual arc, the equivalent measurement is the angle at the center point of shaft 18 between projected lines to the top and bottom edges of containment plate 16. An auger assembly is suitable for use with shield 10 when containment plate 16 has only minor vertical overlap, if any, with the auger blade.

Figure 4:
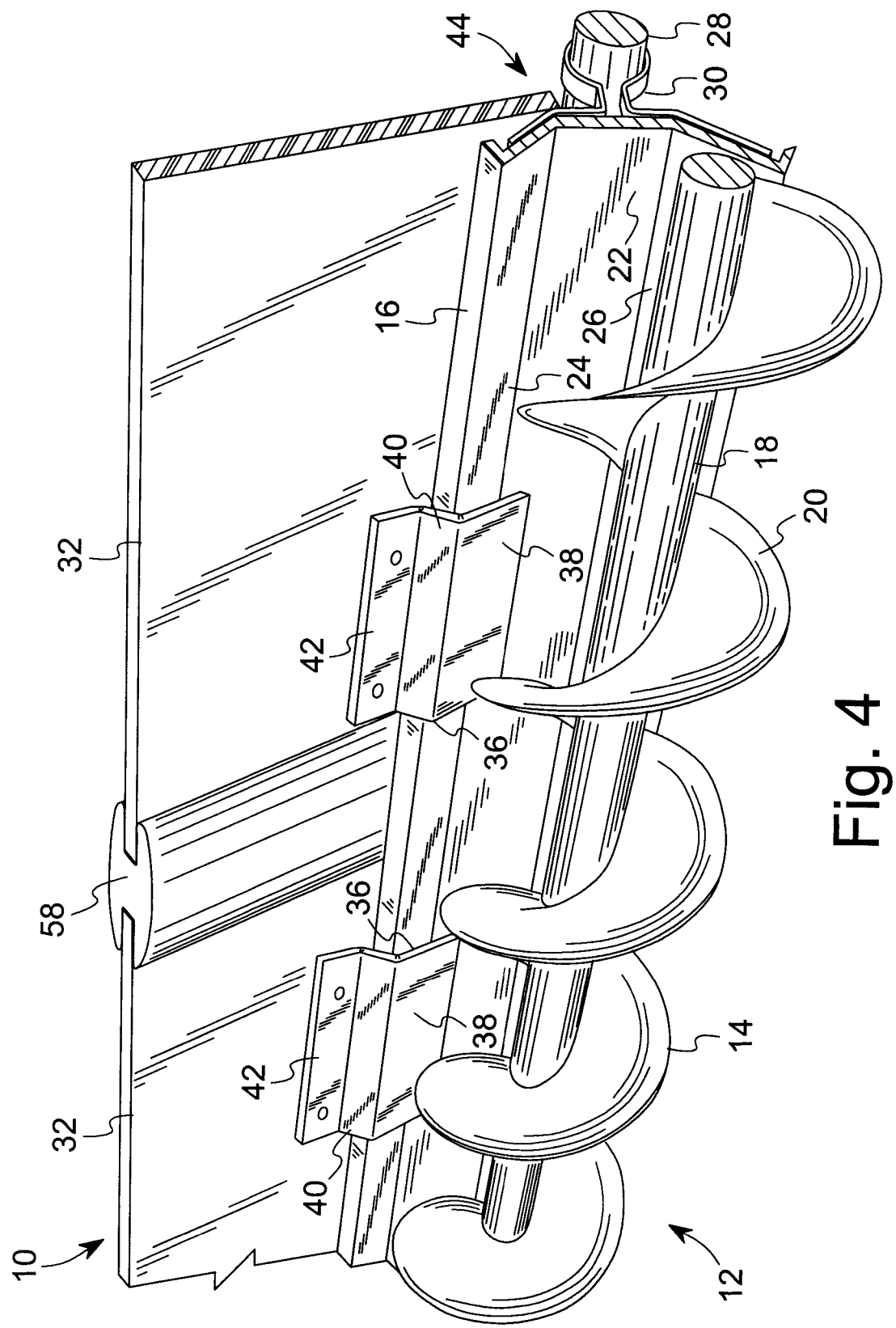
FIG. 4 is a right and front isometric fragmentary view of two juxtaposed avalanche preventative shields installed on a single sweep auger, showing the junction of the shields.
Figure 5:
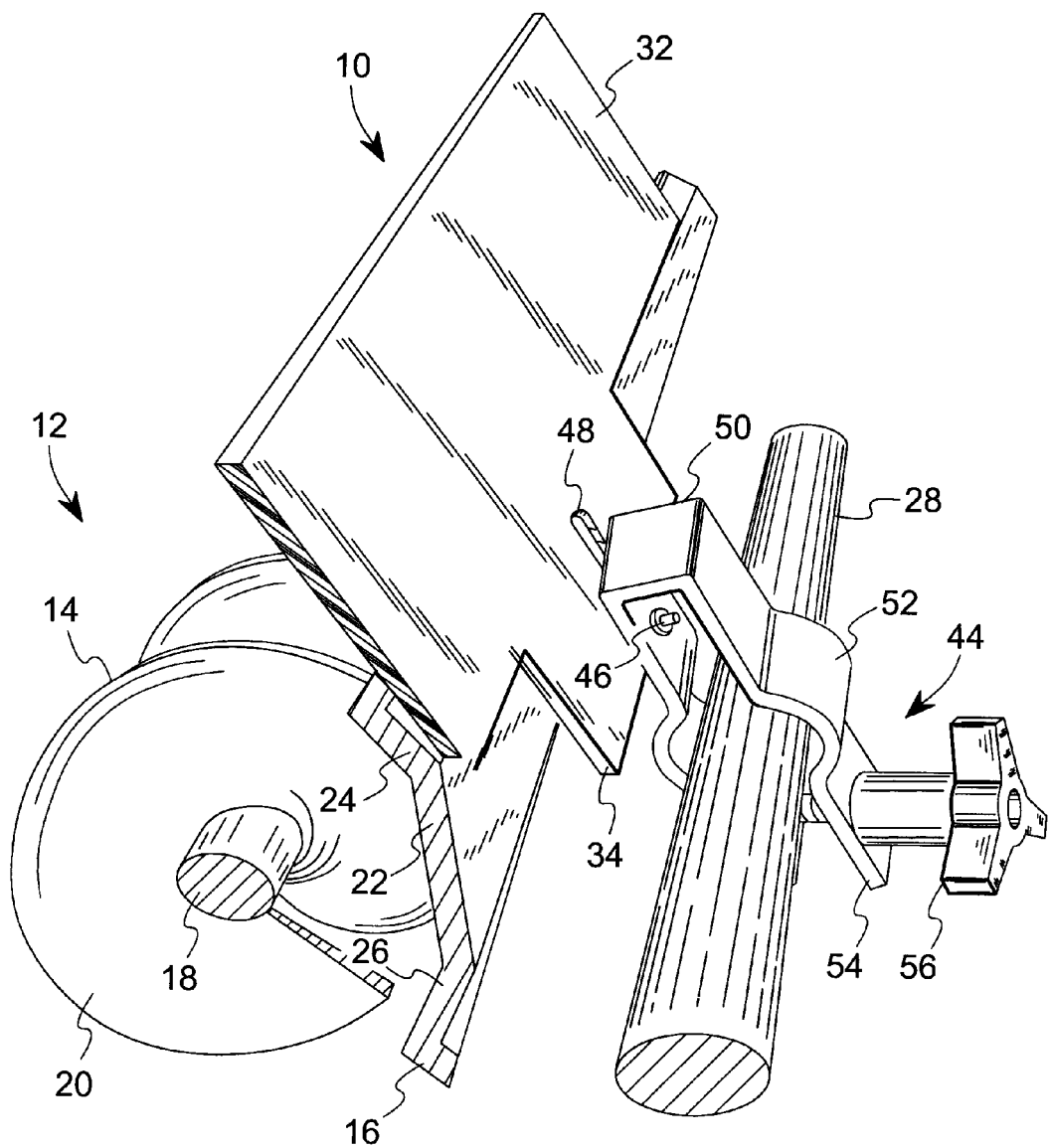
FIG. 5 is a right and rear isometric fragmentary view of an avalanche preventative shield installed on a single sweep auger, showing attachment to a stiffening tube of the sweep auger.

As mentioned, the profile of containment plate 16 may be an arc having a radius slightly larger than the radius of auger flighting 20. For ease of manufacture, containment plate 16 may be formed from a flat central sheet 22 of metal that has a top plate portion 24 and a bottom plate portion 26 angled acutely forward of central sheet 22, as shown in FIGS. 4 and 5. The resulting profile of such a containment plate 16 is a longitudinally elongated trough with the concave side of the trough facing auger blade assembly 14. Top plate portion 24 angles forward by an acute angle, often less than forty-five degrees.

A further defining characteristic of a portable sweep auger assembly 12 is a stiffening tube 28, which may be a tube or pipe that backs containment plate 16. Brackets 30, FIG. 4, fasten containment plate 16 to stiffening tube 26. Stiffening tube 26 is useful for preventing containment plate 16 from sagging.

The ordering among auger blade assembly 14, containment plate 16, and stiffening member 28 establish and define a forward side and a back side of sweep auger assembly 12. Auger blade assembly 14 is the forward member of this group and leads the other two components in the auger assembly's travel, hence defining a front side of auger blade assembly 14. Containment plate 16 is described as backing auger blade assembly 14 because it is to the rear of auger blade assembly 14 relative to the defined forward direction. Stiffening tube 28 is at the back side of the auger blade assembly. Stiffening tube 28 is described as backing containment plate 16 because it is to the rear of containment plate 16 relative to the defined front side.

Auger blade assembly 14 can be defined as having an inner end and an outer end. The inner end is suited to attach to a pivot at the center of a generally circular grain storage bin or at least at a sump or takeout pit in a grain storage bin that may have several such sumps. The pivot often is a vertical rod or pipe mounted to the bin at the sump, and the inner end of sweep auger assembly 12 may include a receptor for the vertical rod, suited to rotate around the rod such that the rod maintains the receptor and the inner end of sweep auger assembly 12 in proximity to the rod as the auger swings around the rod. Thus, the auger generally lies on a radius of the circular bin or at least a radius from a sump, with the pivot rod serving as the center point of the circle. The opposite end of the sweep auger assembly tracks the periphery of the bin or at least the periphery of the defined circle, which is generally the inner circumference of the bin. The outer end carries a powered wheel, roller, or other end support and advancement device that causes the outer end to move forward. A sweep auger assembly 12 includes numerous other components that cooperate to support and operate sweep auger assembly 12.

This disclosure incorporates by reference U.S. Pat. No. 4,008,816 to Harrison for all purposes, but especially to disclose the representative structure of a sweep auger that could be used with shield 10. Harrison discloses commonly used components of a sweep auger, which are referred to within this paragraph by reference to Harrison's numbering system, with Harrison's identification numbers placed in parentheses. The present disclosure refers to an auger blade assembly 14 composed of a shaft 18 and helical flighting 20. Harrison identifies similar components of an auger as a shaft (34) and blade (36). According to the present disclosure, a sweep auger assembly 12 incorporates a motor or drive unit, which Harrison identifies as a shared motor (27), central drive unit (38), and gearboxes (40)(42), as well as other, alternate drive components. The present disclosure includes a pivot at a sump or center of a grain bin for pivotally supporting the inside end of auger assembly 12. Harrison shows a pivot shaft (unnumbered) below gearbox (40) and extending into the top of gearbox (42) and also depending from the bottom of drive unit (52). For purposes of the present disclosure, the motor may or may not be shared, and drive units and gearboxes, if present, can be structured in other ways and may be located at other suitable locations relative to the sweep auger assembly. The present disclosure includes a wheel, roller, or other end support and advancement device at the outer end of the sweep auger assembly. Harrison discloses a corresponding roller (44) supporting the outer end of the sweep auger for advancement around the storage bin. The present disclosure includes the containment plate 16, which Harrison discloses as a corresponding elongated grain-deflecting shield (66). The present disclosure includes a stiffening member, which Harrison discloses as a corresponding torsion tube (68). A sweep auger assembly 12 includes end supports with suitable bearings supporting the auger blade assembly 14. Harrison discloses bearings (56), retainers (58), and bearing brackets (84), among other possible supporting structures. The numerical correlations to Harrison's disclosure provide guidance for locating many of the main features of a typical sweep auger. The present disclosure employs its own naming conventions and numbering system and does not necessarily employ the same names and numbers for equivalent parts as used in Harrison. Further, the sweep auger disclosed in Harrison is merely representative of a sweep auger that may be used in conjunction with the present invention but is not the sole type of suitable sweep auger assembly. Hence, Harrison is an example but not a limitation. Accordingly, sweep augers suitable for use with the invention are subject to numerous variations of specific structure.

Figure 2:
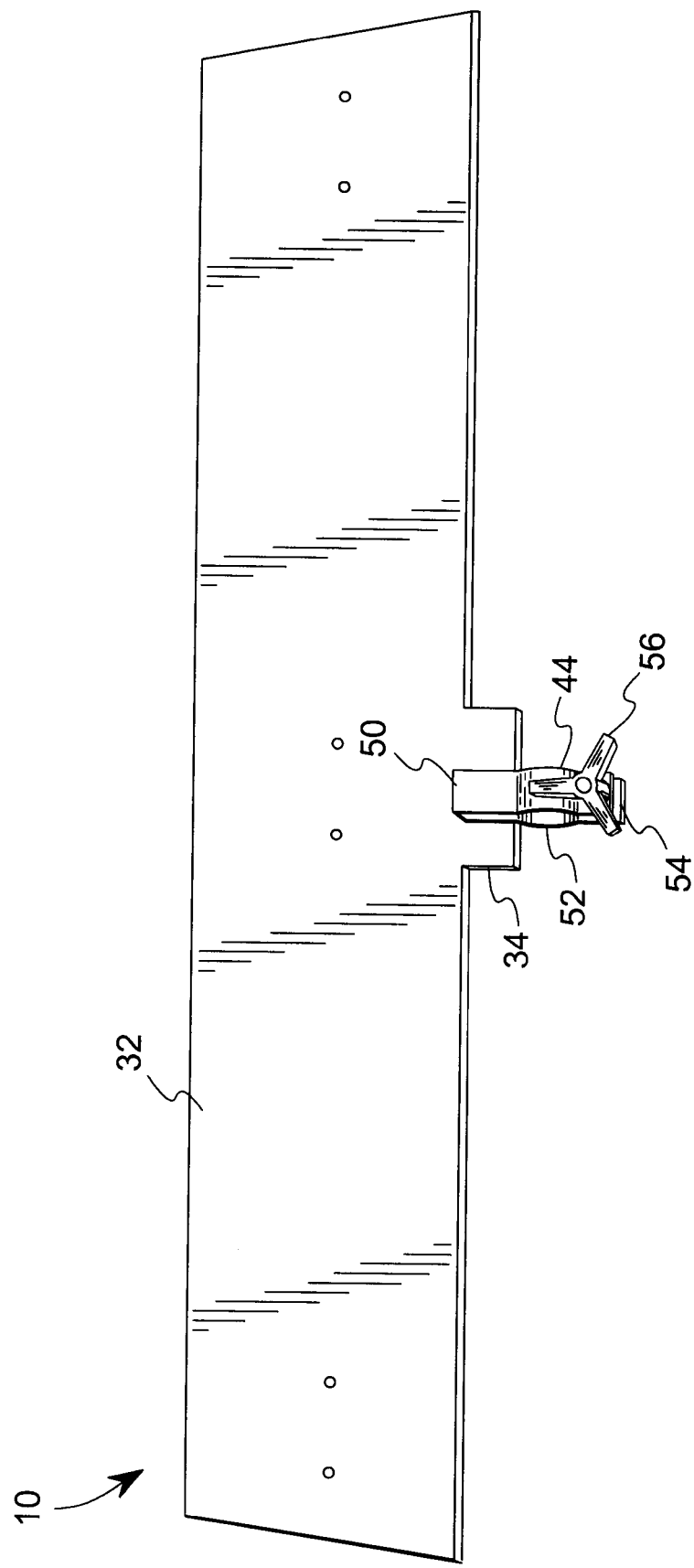
FIG. 2 is a rear isometric view thereof.
Figure 3:
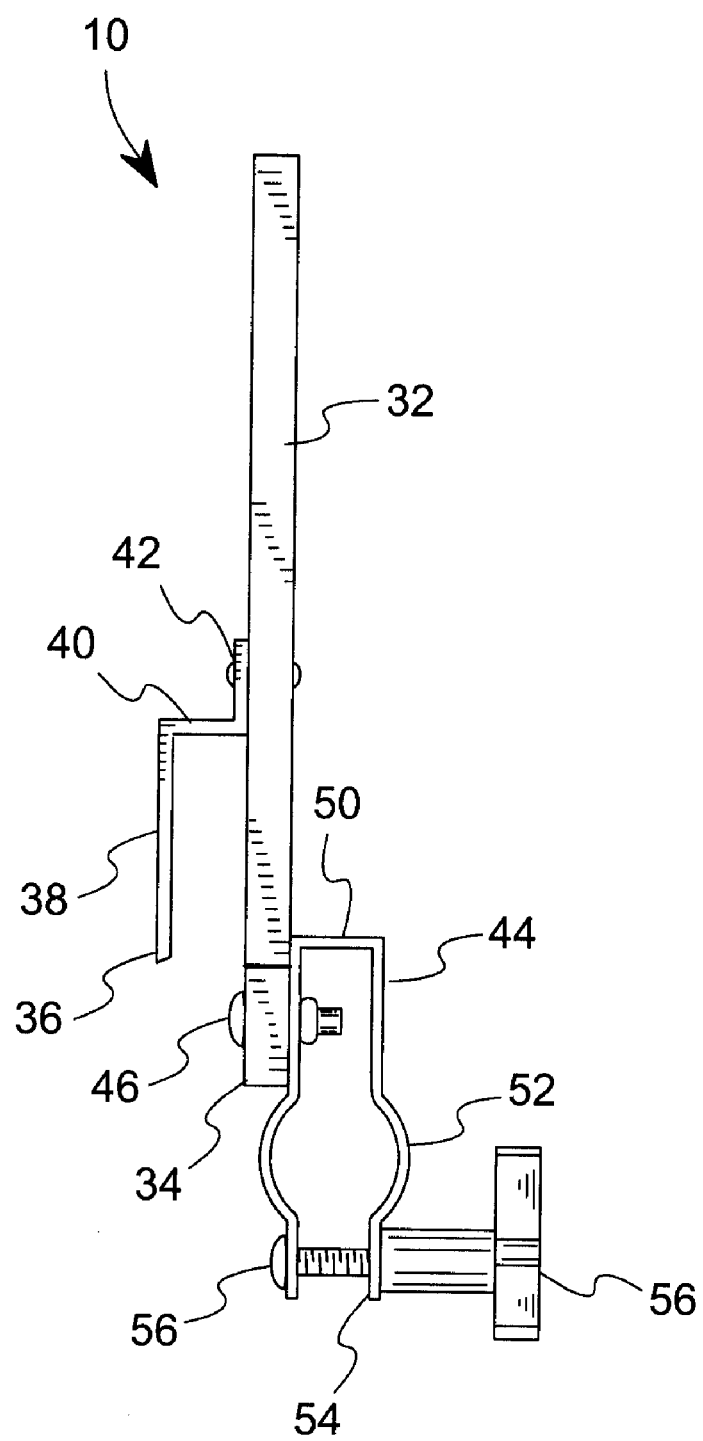
FIG. 3 is a right side isometric view thereof, taken from the right of FIG. 1.

With reference to FIGS. 1-3, portable deflector shield 10 is an aid to the efficient operation of a sweep auger. This device is intended for use on a sweep auger that operates at the top of a load of stored grain, such as the residual grain after a storage bin has been unloaded by gravity. Thus, sweep auger assembly 12 might be one that formerly was buried under grain but is now exposed due to the partial removal of grain, or sweep auger assembly 12 might be one temporarily brought into the storage bin to complete the unloading. A crew working behind a sweep auger might attach deflector shields 10 to the sweep auger to reduce the amount of avalanched grain that the crew otherwise would be shoveling to the working side of the operating auger.

Portable deflector shield 10 is formed of a panel 32 that is sized to serve as a supplement to the height of existing containment plate 16. Panel 32 is configured as a rectangle with an integrally formed, depending tab 34 at the center of the lower edge. Shield 10 is shrewdly sized in length to fit conventionally designed portable sweep augers and to cooperate and combine with additional like shields 10 to match the length of containment plate 16. A suitable shield sizing includes a three-foot length, which corresponds to a commonly found length increment in portable sweep augers. Likewise, the length of shield 10 can be chosen to match another length increment such as a five-foot increment, or a shield may be sized in multiple length increments to reduce the need for numerous individual shield units. Thus, for a length increment of three feet, a shield may be a multiple increment such as six, nine, or twelve feet long, while additional shields might be three feet long to allow a final supplementing of the cumulative length of a row of shields 10 to match the length of a containment plate 16.

Suitable dimensions of a tab 34 are about a four-inch width and about a one and one-half inch height. Tab 34 defines a central vertical slot that is sized to receive a rivet in a vertically sliding relationship. A suitable size is about one-quarter inch wide and about three-quarters inch high, spaced from the bottom edge of the tab by about one-half inch. The presence of tab 34 is an option. Instead of using a depending tab, panel 32 could be extended from the bottom edge by the vertical dimension of the tab, i.e., by one and one-half inches. The greater panel height would result in equivalent functionality, described below. A tab of limited dimensions is preferred for efficient use of material.

A suitable height for the rectangular portion of panel 32, as measured at the reveal, i.e., the portion exposed above a containment plate 16, is preferred to be about a half or more of the height or diameter of auger flighting 20. Sweep augers are commonly available in diameters of three to sixteen inches. The more common sizes are six, eight, or ten inches. A portable sweep auger will employ the smaller of these sizes due to practicality of handling and transportation. A six-inch diameter sweep auger is considered suitable for use in grain bins up to thirty-six feet in diameter. Eight and ten-inch augers are available for larger grain bins. A single, suitable height of panel 32 for many of these applications is about seven inches, excluding tab 34. When a panel 32 of this single preferred height is attached to a containment plate 16, the panel extends above the containment plate by a reveal of about five inches, and the bottom two inches of the panel 32 are consumed in the attachment below the top edge of the containment plate, as explained below. Thus, a panel 32 with seven-inch height provides a reveal of at least approximately fifty-percent of the auger diameter for augers up to ten inches in diameter. This additional area over the containment plate 16 results in a significant reduction of grain avalanche when used with the common auger sizes mentioned, above. In addition, a panel 32 that is seven inches high and three feet long can be manufactured from 125 gauge plastic, producing a panel that is strong enough for a working environment and conveniently sized for handling and installation on a sweep auger. Although plastic is a suitably strong and economical material for producing shield 10, this material and other materials mentioned in this disclosure are offered for purposes of example and not as limitations.

A cooperating system of securing devices engages the panel 32 to sweep augers of many common configurations. As best shown in FIGS. 1 and 3, one side of shield 10 carries means for establishing the reveal when engaging a containment plate 16. Panel 32 can be placed partially behind the containment plate, with the reveal constituting the portion of the panel that is exposed above containment plate 16. A leading flange wall or other type of stop means extends from the front face of panel 32 to rest on the top edge of containment plate 16 for defining the reveal of panel 32 above the containment plate.

A catch means includes a catch wall that depends from the front of the stop means or leading flange wall. The catch wall is spaced from panel 32 by a suitable distance to receive the top of containment plate 16 between the catch wall and panel 32. The catch wall cooperates with the stop means to define a cavity that is suited to receive the top of the containment plate. Thus, the cavity defined by the stop means and catch means receives and engages with a top and front portion of containment plate 16. The front surface of panel 32 may define a back wall of the cavity for engaging panel 32 with the top edge of containment plate 16.

A channel hook 36 is a preferred means of supplying the stop means and catch wall for establishing the reveal. One or more channel hooks 36 are located on the front or leading face of panel 32. A channel hook 36 has suitable surfaces to engage the top edge, front face, and rear face of panel 32 so that a reveal portion of panel 32 is established above the containment plate. Channel hook 36 is spaced downward from the top edge of panel 32 and preferably is located near the bottom edge of the rectangular portion of panel 32. Three channel hooks 36 are suitable for placement on each panel 32, spaced with one near each side edge and one in the center. A preferred channel hook is about three and one-half inches long. A different number, size, or configuration could be used, such as a single continuous channel hook that extends from edge to edge of a panel 32.

Channel hooks 36 are open at the bottom. A closed top wall of the channel hook serves as the stop means and establishes the reveal above the stop means or top or the hook. Spaced apart front and rear walls of channel hook 36 is coupled with the stop means define the cavity for engaging panel 32 with the top edge of containment plate 16. The spacing is suitable to receive the top portion of containment plate 16, such as a top plate portion 24. Typical suitable spacing between front and rear walls ranges from about one-half inch to about three-quarters inch. The channel hooks may be formed of flexible plastic such that they can deflect if necessary to receive a containment plate 16. The depth of a channel hook from open bottom to closed top can be about two inches.

One method of forming the channel hooks on panel 32 is to attach an L-shaped channel front structure. One arm of the L-shaped structure forms the catch wall or front hook wall 38 that is approximately parallel to panel 32. The other arm of the L-shaped structure forms a stop means or top hook wall 40 that is a connecting wall between the front hook wall 38 and panel 32. In this arrangement, a lower portion of panel 32 below top wall 40 forms a rear wall of channel hook 36, completing a cavity that receives the top of the containment plate. The height of channel hook top 40 on panel 32 defines the approximate division between the upper reveal portion of panel 32 and the lower portion of panel 32. The lower portion of panel 32 may define a rear wall of hook 36 or may be backing for such a rear wall where hook 36 includes a separate rear wall. The upper portion of panel 32 constitutes the reveal, above the containment plate, while the lower portion carries the system of fasteners that aligns and supports panel 32 on sweep auger assembly 12.

A fastener wall 42 adjacent top channel wall 40 parallel to the front of panel 32 provides a means for attaching the L-shaped channel front to panel 32. Each fastener wall 42 may be fastened to the panel 32 by rivets, as shown in FIGS. 1-5. Fastener wall 42 is above the functional portion of channel hook 36 and extends into the reveal. Glue is another means for attaching channel hook 26. If fastener wall 42 is glued to panel 32, fastener wall 42 may extend downwardly instead of upwardly from top wall 40 and, if desired, the fastener wall may be extended in length toward the bottom edge of the panel 32, constituting a separate rear wall of the channel hook. In addition, a separate rear wall is desirable to provide increased surface area for adhering the hook to the panel 32. Alternatively, shield 10 could be extruded, and an integral, full-length channel hook could be formed as an integral part of the extrusion.

As a result of auger blade rotation, impact from moving grain, and forward advancement of the auger over the irregular surface of a grain, shield 10 is subjected to vibration and other dislodging forces. Means for vertically stabilizing the panel 32 against upward dislodgment may supplement channel hooks 36 in maintaining shield 10 on containment plate 16. Vertically stabilizing the panel refers to prevention of raising the shield 10 off containment plate 16 even at non-vertical angles when the auger is in any orientation, which may vary from exact vertical due to the auger's travel over non-horizontal surfaces.

Accordingly, shield 10 employs a means for securing the shield at a preselected vertical or overhead position with respect to containment plate 16, such that channel hooks 36 will not accidentally be dislodged. Shield 10 carries a vertical position stabilizing means for preventing panel 32 from rising with respect to containment plate 16. This vertical position stabilizing means may be mounted to the rear face of panel 32 for engaging a structure of sweep auger assembly 12 this is fixed in relative height to the top of containment plate 16. Accordingly, the engaged structure may be another part of containment plate 16, or it may be a different component of sweep auger assembly 12 that has fixed relative position to containment plate 16. Stiffening tube 28 is a suitable and convenient attachment point for the vertical position stabilizer. An attachment between panel 32 and stiffening tube 28 is a means for preventing panel 32 from substantially rising with respect to containment plate 16.

A suitable example of a vertical position stabilizer is a tightening brace or tube clamp 44, which can prevent channel hooks 36 from substantially rising or dislodging from containment plate 16 during operation of sweep auger assembly 12. A tube clamp 44 is configured with an open end to admit stiffening tube 28. Because brackets 30 fasten containment plate 16 to stiffening tube 28, tube clamp 44 provides a secure attachment to the same reference structure to ensure that shield 10 will be stable in its position with respect to containment plate 16. Tab 34 that depends from the plate 32 is adapted to carry clamp 44. For example, a fastener 46 such as a rivet or a carriage bolt and nut may extend through a wall of the clamp and through tab 34 at slot 48.

In order to be effective for preventing avalanche, shield 10 should be mounted above the containment plate and with the reveal disposed at a suitable forward acute angle. A forward angle of about thirty degrees is desirable, although the reveal is adjustable within a range to allow the selection of other angles. In addition to the means establishing the reveal, shield 10 employs a means for establishing a forward angle of the reveal. The vertical stabilizing means, exemplified by tube clamp 44, may serve this second function, as well.

Vertical slot 48 in tab 34 establishes a slidable junction with fastener 46. Slot 48 may receive a fastener 46 that secures clamp 44 to panel 32. The slidable junction allows fastener 46 to slide on a top-to-bottom axis or line of motion according to the orientation of the slot. The ability to slide can change the position of clamp 44 with respect to the remainder of shield 10. This adjustment can alter and secure the angle of the shield. A slot in the attached wall of clamp 44 could function as another variety of sliding junction.

In addition, shield 10 employs a means for adapting the attachment of shield 10 to a variety of auger constructions. Different manufacturers build sweep augers in different sizes and with small structural variations. Shield 10 is adapted to fit a variety of differing structures, especially those involving spacing variations that are parallel to the top-to-bottom axis of the slidable junction of the tube clamp. This adaptation is the ability of one type of securing device to be moved between multiple stable positions. For example, shield 10 employs fixed channel hooks 36 attached to the front face of the shield, and the shield employs a slidable clamp 44 attached to the rear face at slot 48 in tab 34. In this arrangement, a sliding junction such as slot 48 in tab 34 provides adaptability. A sliding or other vertically adjustable junction is desirable between shield 10 and at least the rear vertical stabilizer, in order to adjust at least one of the securing devices so that shield 10 fits augers of various proportions. Specifically, tube clamp 44 accommodates differences in the heights of various containment plates 16 relative to the position of corresponding stiffening tubes 28, which tubes tends to be uniformly near the mid-height of containment plates 16.

The closeness of stiffening tube 26 to containment plate 16 in most commercial auger designs creates difficulty in employing conventional clamps. As best shown in FIGS. 3 and 5, the preferred clamp 44 has an open end and an opposite closed end. The clamp is configured to have a long neck 50 defining the closed end and fastened at a sidewall of the neck 50 to the tab 34, thereby orienting the open end of the tube clamp to face downwardly from the bottom of shield 10. With both the open end of clamp 44 and channel hook 36 facing downwardly, the process of applying the shield to a sweep auger can take place is a single direction of application.

A central portion of clamp 44 between the open and closed ends is configured with arced walls 52 defining an approximately circular reception area for engaging the stiffening tube. These arced walls 52 should be coated with a plastic or rubber material to provide a firm grip on stiffening tube 28. Arced wall portions 52 are sized to receive a stiffening tube 28 of conventional size, such as with one-inch diameter.

Clamp 44 carries means for tightening the clamp to stiffening tube 28. The tightening means may be a threaded fastener suitably joined to the clamp for tightening the clamp on stiffening tube 28. Such a tightening means may be carried on the clamp at any position where the tightening means is operable to close the clamp on the tube. Placement above the arced walls 52 is convenient because the tightening means need not be removed before placing the clamp on the tube. Placement below the arced walls 52 requires that the tightening means is removed until the clamp has received the tube, after which the tightening means is reinstalled. The tightening means may be a knob and bolt set 56, where the bolt is preferred to be a carriage bolt that mounts in a square hole of the clamp so that the carriage bolt will not turn. The knob may be a multi-finger knob that allows easy hand-engagement for turning. The lower end 54 of the clamp 44 is the open end. Knob and bolt set 56 may be installed across the open end 54 for manually tightening the clamp on stiffening tube 28. A knob and carriage bolt set 56 can tighten a clamp 44 by turning the knob without requiring tools for installation. The attachment to stiffening tube 28 establishes shield 10 at a fixed angle and fixed height with respect to containment plate 16.

In addition to serving as a vertical position stabilizer, tube clamp 44 also serves was a longitudinal stabilizer. By establishing a fixed attachment point on the stiffening tube, clamp 44 prevents shield 10 from sliding sideways. Clamp 44 ensures a firm positioning of panel 32 with respect to both containment plate 16 and stiffening tube 28 by preventing movement in either lateral direction after clamp 44 is tightened. Clamp 44 may be three-quarters inch wide, which is sufficient for the described function.

A plurality of shields 10 is installed in series on a sweep auger to provide avalanche control over substantially the full length of the auger assembly 12. With reference to FIG. 4, H-brackets 58 have laterally open slots that engage juxtaposed edges of adjacent shields 10 to close any gap between shields 10 and to enable each shield 10 to support its neighboring shields 10. Each H-bracket 58 is about the same height as a panel 32, or about seven inches, and is about one inch wide. Channel hooks 36 and stiffening tube braces 44 hold H-brackets 58 against containment plate 16 with sufficient friction to prevent H-brackets 58 from sliding off panels 32. The entire system for holding shields 10 on containment plate 16 includes channel hooks 36, stiffening tube braces 44, and H-brackets 58. These securing devices cooperate with one another to ensure proper placement and performance of shields 10.

H-brackets 58 not only close the gap between neighboring panels 32 but also allow each panel 32 to be interlocked with the others and to present a uniform and contiguous back panel for the entire length of the portable sweep auger. Further, use of H-brackets 58 allows slight movement of each panel 32, accommodating variations in placement of successive shields 10. Variations in placement may be necessary due to design variance in different sweep auger brands. The ability to provide a wide range of adjustment of shields 10 lies in three front channel hooks 36, rear tightening clamp 44, and H-bracket 58. Flexibility of horizontal position and flexibility of left to right positioning and right to left positioning ensures that shield 10 can be adjusted to avoid an additional carrier bearing or support brace that some sweep augers brands employ in the design of the auger and containment plate.

FIGS. 4 and 5 show an installed shield 10 on a sweep auger assembly 12. Shield 10 is installed without requiring tools. The knob and carriage bolt fastener set 56 is removed from clamp 44 prior to initial installation so that the open bottom of clamp 44 readily receives stiffening tube 28. With a downward motion, shield 10 is placed behind containment plate 16 such that channel hooks 36 engage over the top of containment plate 16, and clamp 44 engages over the top of stiffening tube 28. A worker need make only minor adjustment to the angle of shield 10 and to the height of clamp 44 in slot 48 before installing and tightening carriage bolt and knob set 56 across open bottom 54 of clamp 44. Where a series of shields 10 are installed along the length of containment plate 16, the worker also adds H-brackets 58 by sliding these down between adjacent shield edges, continuing until a portion of each H-bracket 58 is pressed between shields 10 and the back of containment plate 16. With shields 10 secured in place, sweep auger assembly 12 can be operated to clear grain from the storage bin with little or no avalanche over the sweep auger.

The results of using shield 10 on a sweep auger are labor savings, increased efficiency of operation, increased productivity, and reduction of effort during operation. All types of grains have a propensity to avalanche over existing portable sweep augers. Avalanching of grain is a result of several variables that otherwise cannot be controlled, such as moisture variances of the grain, settling of the grain within the grain bin, and location of the sump or takeout pit. Shield 10 substantially eliminates the problems associated with grain avalanching.

The substantial elimination of avalanched grain saves time otherwise committed to cleanup shoveling and brooming to move such grain to the working side of the portable sweep auger. The elimination of grain avalanching also increases the productivity of the portable sweep auger because more grain is channeled on the working side of the auger, resulting in more efficient grain movement to the takeout pit or grain sump. The more efficient delivery of grain to the sump fills trucks or wagons more quickly, allowing more rapid movement of the grain to market. The end result is increased efficiency of the portable sweep auger, increased efficiency of unloading the grain bin, increased efficiency of loading trucks or wagons, and increased timeliness for the operator.

For many augers that operate well below their payload capacity when unassisted by grain deflectors 10, the addition of grain deflectors 10 is effective to increase the operating load of the auger and to upgrading the auger's performance by causing it to operate nearer payload capacity. A sweep auger assisted by grain deflectors 10 conveys a greater average payload than achieved during equivalent unassisted operation, thus increasing the practical operating capacity of the auger.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. A portable deflector shield for managing grain intake to a sweep auger to prevent grain for avalanching over the auger, in use suited for attachment to the containment plate and stiffening tube of a sweep auger, comprising:

a longitudinally elongated panel having front and rear major faces, top and bottom edges, and side edges at longitudinally opposite ends;

engagement means for, in use, engaging over the top edge of a containment plate of a sweep auger, said engagement means including stop means and catch means, wherein said stop means extends in leading position from said front face of said panel with longitudinal orientation and is spaced between said top and bottom edges of the panel, such that the stop means is suited for, in use, engagement against a top edge of a containment plate of a sweep auger such that said stop means supports an upper portion of the panel above the containment plate, thereby defining a reveal portion of the panel above the stop means;

said catch means depends from the stop means and together with the stop means defines an open-bottom cavity between the catch means and panel;

vertical position stabilizing means located in a trailing position relative to the rear face of the elongated panel, adapted in use to engage a stiffening tube of a sweep auger for establishing the elongated panel at a forward angle on the containment plate.

2. The deflector shield of claim 1, wherein said engagement means comprises a channel hook, wherein:

said stop means is a top wall of said channel hook;

said catch means is a front wall of the channel hook and is spaced from said front face of said panel;

the channel hook is oriented with respect to the panel with an open bottom and open opposite side edges and defines said cavity between said open bottom and said top wall.

3. The deflector shield of claim 1, wherein said vertical position stabilizing means comprises:

a tightening clamp jointed to said panel at the rear face thereof and adapted, in use, to engage a stiffening tube of a sweep auger for securing said elongated panel against lateral movement with respect to the sweep auger.

4. The deflector shield of claim 3, further comprising:

a slidable junction interconnecting said panel and said tightening clamp, wherein said slidable junction allows relative motion in at least a top-to-bottom orientation with respect to the panel such that the position of the tightening clamp is variable with respect to the panel, thereby accommodating attachment, in use, of the tightening clamp to sweep augers of different dimensions between relative positions of their containment plate and stiffening tube.

5. The deflector shield of claim 3, wherein:

said panel defines a slot with an axis of top-to-bottom elongation;

and further comprising a fastener slidably mounted in said slot and interconnecting the panel and said tightening clamp such that the panel and tightening clamp are relatively slidable with respect to one another on said axis of elongation and the position of the tightening clamp is variable on the axis of elongation to accommodate attachment, in use, to sweep augers of different dimensions between relative positions of their containment plate and stiffening tube, parallel to the axis of elongation.

6. The deflector shield of claim 1, wherein said deflector shield is a first deflector shield and said elongated panel is a first elongated panel, further comprising:

a longitudinally extended series of deflector shields defined by at least said first deflector shield and a second deflector shield, wherein said second deflector shield includes a second elongated panel;

said first and second elongated panels are longitudinally aligned in series with a first side edge of the first panel juxtaposed to a second side edge of the second panel, defining a gap between said juxtaposed first and second edges; and a gap closing bracket defining first and second parallels slots facing in opposite directions such that said first slot receives the juxtaposed first side edge of the first panel and said second slot receives the juxtaposed second side edge of the second panel, and the gap closing bracket positions the first and second panels in longitudinal alignment.

7. A grain deflector shield for installation on a grain sweep auger for preventing grain avalanche over the sweep auger, having a top edge, bottom edge, and front and rear faces, and suited, in use, for mounting to a sweep auger assembly having an auger blade, a containment plate backing the auger blade, and a stiffening tube backing the containment plate, the grain deflector comprising:

an elongated panel having an upper panel portion defining a reveal and having a lower panel portion supporting a system of securing devices for mounting the elongated panel;

wherein said system of securing devices comprises:

a channel hook connected to the front face of said panel, having an open bottom and open sides suited, in use, for placement over a top of a containment plate, and having a top wall that, in use, limits entry of the containment plate into the channel hook and establishes a division between the upper and lower panel portions; and a tube clamp connected to the rear face of said lower portion of said panel, having an open end for, in use, placement over a stiffening tube of a sweep auger, and having a means for tightening said tube clamp;

and further comprising a slidable junction between said deflector panel and tube clamp allowing relative movement of the tube clamp over a top-to-bottom line of motion.

8. The grain deflector shield of claim 7, wherein said tube clamp is oriented with respect to said panel with said open end facing down; and the tube clamp is connected to said panel at a side wall of the tube clamp.

9. The grain deflector shield of claim 7, further comprising:

a slidable junction interconnecting said panel and said tube clamp, wherein said slidable junction allows relative motion in at least a top-to-bottom orientation with respect to the panel such that the position of the tube clamp is variable with respect to the panel, thereby accommodating attachment, in use, of the tube clamp to sweep augers of different dimensions between relative positions of their containment plate and stiffening tube.

10. The grain deflector shield of claim 7, wherein:

said elongated panel comprises a major rectangle and further comprises a tab depending from the bottom edge of the major rectangle;

said tab defines a slot with an axis of top-to-bottom elongation;

and further comprising a fastener slidably mounted in said slot and interconnecting the panel and said tube clamp such that the panel and tube clamp are relatively slidable with respect to one another on said axis of elongation and the position of the tube clamp is variable on the axis of elongation to accommodate attachment, in use, to sweep augers of different dimensions between relative positions of their containment plate and stiffening tube, parallel to the axis of elongation.

11. The grain deflector shield of claim 7, wherein:

said elongated panel comprises a major rectangle and further comprises a tab depending from the bottom edge of the major rectangle;

and further comprising a slidable junction interconnecting said tab and said tube clamp, wherein said slidable junction allows relative motion in at least a top-to-bottom orientation with respect to the tab such that the position of the tube clamp is variable with respect to the tab, thereby accommodating attachment, in use, of the tube clamp to sweep augers of different dimensions between relative positions of their containment plate and stiffening tube.

\* \* \* \* \*